US007856665B2

(12) United States Patent
Rutgers et al.

(10) Patent No.: US 7,856,665 B2
(45) Date of Patent: Dec. 21, 2010

(54) APPARATUS AND METHOD FOR SCANNING CAPACITANCE MICROSCOPY AND SPECTROSCOPY

(75) Inventors: Maarten Rutgers, Los Angeles, CA (US); William H. Hertzog, Goleta, CA (US); Keith M. Jones, Cary, NC (US); Amir A. Moshar, Oxford (GB)

(73) Assignee: Asylum Research Corporation, Santa Barbara, CA (US)

( * ) Notice: Subject to any disclaimer, the term of this patent is extended or adjusted under 35 U.S.C. 154(b) by 495 days.

(21) Appl. No.: 11/985,597

(22) Filed: Nov. 15, 2007

(65) Prior Publication Data

US 2009/0084952 A1    Apr. 2, 2009

Related U.S. Application Data

(60) Provisional application No. 60/859,269, filed on Nov. 15, 2006.

(51) Int. Cl.
*G01Q 60/24* (2010.01)
*G01Q 60/46* (2010.01)

(52) U.S. Cl. .................. 850/44; 850/21; 850/33; 250/306; 250/307; 324/724; 977/866

(58) Field of Classification Search .......... 850/1, 850/2, 3, 4, 5, 7, 8, 9, 10, 11, 21, 23, 24, 850/25, 32, 33, 37, 39, 41, 22, 36, 38, 40, 850/42, 44, 45; 250/306, 307; 977/866; 73/105; 324/722, 724
See application file for complete search history.

(56) References Cited

U.S. PATENT DOCUMENTS

RE32,457 E     7/1987   Matey 5,804,709 A *  9/1998   Bourgoin et al. .............. 73/105
6,172,506 B1   1/2001   Adderton et al.

(Continued)

FOREIGN PATENT DOCUMENTS

WO    WO 2008/060624    5/2008

OTHER PUBLICATIONS

J.S. McMurray et al., "Quantitative measurement of two-dimensional dopant profile by cross-sectional scanning capacitance microscopy," J. Vac. Sci. Technol. B 15(4), Jul./Aug. 1997, 0734-211X/97/15(4)/1011/4/$10.00, 1997 American Vacuum Society, pp. 1011-1014.

(Continued)

*Primary Examiner*—Jack I Berman
*Assistant Examiner*—Nicole Ippolito Rausch
(74) *Attorney, Agent, or Firm*—Law Office of Scott C. Harris, Inc.

(57) ABSTRACT

An apparatus and technique for measuring the electrical capacitance between a conducting tip of a scanning probe microscope and a sample surface is described. A high frequency digital vector network analyzer is connected to the probe tip of the cantilever of an atomic force microscope, and data collection is coordinated by a digital computer using digital trigger signals between the AFM controller and the vector network analyzer. Methods for imaging tip-sample capacitance and spectroscopic measurements at a single point on the sample are described. A method for system calibration is described.

20 Claims, 9 Drawing Sheets

U.S. PATENT DOCUMENTS

| | | | |
|---|---|---|---|
| 6,597,194 | B2 | 7/2003 | Weiss et al. |
| 6,823,724 | B1* | 11/2004 | Kobayashi et al. ............ 73/105 |
| 6,856,145 | B2 | 2/2005 | Pelz et al. |
| 6,975,129 | B2 | 12/2005 | Chang |
| 7,001,785 | B1* | 2/2006 | Chen ........................... 438/10 |
| 7,023,220 | B2 | 4/2006 | Pelz |
| 7,093,509 | B2 | 8/2006 | Shao et al. |
| 2005/0174130 | A1* | 8/2005 | Bonnell et al. .............. 324/719 |
| 2006/0027739 | A1* | 2/2006 | Warren et al. ............... 250/234 |
| 2007/0163335 | A1* | 7/2007 | Huang et al. .................. 73/105 |

OTHER PUBLICATIONS

Kazuya Goto et al., "Tip-sample capacitance in capacitance microscopy of dielectric films," *Journal of Applied Physics*, vol. 84, No. 8, Oct. 15, 1998, Downloaded Oct. 3, 2008 to 129.10.107.106. Redistribution subject to AIP license or copyright; see http://jap.aip.org/jap/copyright.jsp, 0021-8979/98/84(8)/4043/6/$15.00, 1998 American Institute of Physics, pp. 4043-4048.

David T. Lee et al., "Instrumentation for direct, low frequency scanning capacitance microscopy, and analysis of position dependent stray capacitance," *Review of Scientific Instruments*, vol. 73, No. 10, Oct. 2002, Downloaded Oct. 3, 2008 to 129.10.107.106. Redistribution subject to AIP license or copyright; see http://rsi.aip.org/rsi/copyright.jsp, 0034-6748/2002/73(10)/3525/9/$19.00, 2002 American Institute of Physics, pp. 3525-3533.

J.R. Matey et al., "Scanning capacitance microscopy," *J. Appl. Phys.* 57 (5), Mar. 1, 1995, Downloaded Oct. 3, 2008 to 129.10.107.106. Redistribution subject to AIP license or copyright; see http://jap.aip.org/jap/copyright.jsp, 0021-8979/85/051437-08$02.40, 1995 American Institute of Physics, pp. 1437-1444.

C. C. Williams, "Two-Dimensional Dopant Profiling by Scanning Capacitance Microscopy," *Annu. Rev. Matter. Sci.* 1999. 29:471-504, 0084-6600/99/0801-0471$08.00, 1999 by Annual Reviews, pp. 471-504.

International Search Report and Written Opinion dated May 20, 2008 for PCT/US2007/024091, filed on Nov. 15, 2007, published as WO 2008/060624, and entitled: "Apparatus and Method for Scanning Capacitance Microscopy and Spectroscopy" (8 pages).

* cited by examiner

US 7,856,665 B2

APPARATUS AND METHOD FOR SCANNING CAPACITANCE MICROSCOPY AND SPECTROSCOPY

CLAIM OF PRIORITY

This application claims priority under 35 USC §119(e) to U.S. Patent Application Ser. No. 60/859,269, filed on Nov. 15, 2006, the entire contents of which are hereby incorporated by reference.

BACKGROUND OF THE INVENTION

Doped semiconductors have long been characterized by sandwiching a metal conducting layer, an insulating layer, a layer of the semiconductor to be tested, and another layer of metal. Typically the capacitance is measured as a function of the voltage applied to the metal layers. The functional dependence of measured capacitance to the applied bias voltage can be related to properties of the incorporated semiconductor. A typical property of interest is the dopant type and concentration.

While the above technique is useful for measuring properties of bulk semiconductors, it is not easily applied to the measurement of local properties in, for instance, a fabricated microelectronic circuit.

Atomic force microscopes have been applied to the problem by creating an in situ capacitor by placing a sharp conducting probe in contact with a doped semiconductor sample sitting on a conducting substrate. The tip-sample capacitance is typically measured using a circuit with a high resonance frequency (typically in the 1 GHz range). The resonance frequency of this circuit is a function of the tip-sample capacitance. Typically this frequency is not measured directly, but instead a lower frequency bias voltage oscillation is applied between the tip and the sample concurrently with a high frequency excitation of the circuit. The standard technique ultimately results in a measurement of the variation of tip-sample capacitance with applied bias voltage. This is enough information to identify neighboring regions as P doped or N doped, but not enough to determine the absolute dopant concentration. For most non-semiconducting samples, the above mentioned method will not yield any signal.

One exemplary method based on the techniques and apparatus described herein employs an AFM and a vector network analyzer to directly measure the resonance frequency of a circuit including tip and sample, and thereby to measure the tip-sample capacitance. The method does not require the application of a DC or time varying tip-sample bias voltage (although it does allow the application of voltage biases) and is not limited to semiconductor samples. The method can be applied in a scanning situation to produce an image variation in tip-sample capacitance. It can also be applied at a single point to produce plots of tip-sample capacitance as a function of tip-sample bias voltage.

An AFM is a device used to produce images of surface topography (and/or other sample characteristics) based on information obtained from scanning (e.g., rastering) a sharp probe on the end of a cantilever relative to the surface of the sample. Topographical and/or other features of the surface are detected by detecting changes in deflection and/or oscillation characteristics of the cantilever (e.g., by detecting small changes in deflection, phase, frequency, etc., and using feedback to return the system to a reference state). By scanning the probe relative to the sample, a "map" of the sample topography or other sample characteristics may be obtained.

Changes in deflection or in oscillation of the cantilever are typically detected by an optical lever arrangement whereby a light beam is directed onto the cantilever in the same reference frame as the optical lever. The beam reflected from the cantilever illuminates a position sensitive detector (PSD). As the deflection or oscillation of the cantilever changes, the position of the reflected spot on the PSD changes, causing a change in the output from the PSD. Changes in the deflection or oscillation of the cantilever are typically made to trigger a change in the vertical position of the cantilever base relative to the sample (referred to herein as a change in the Z position, where Z is generally orthogonal to the XY plane defined by the sample), in order to maintain the deflection or oscillation at a constant pre-set value. It is this feedback that is typically used to generate an AFM image.

AFMs can be operated in a number of different sample characterization modes, including contact mode where the tip of the cantilever is in constant contact with the sample surface, and AC modes where the tip makes no contact or only intermittent contact with the surface.

DETAILED DESCRIPTION

Apparatus and techniques are described for generating images of tip-sample capacitance.

Figure 1:
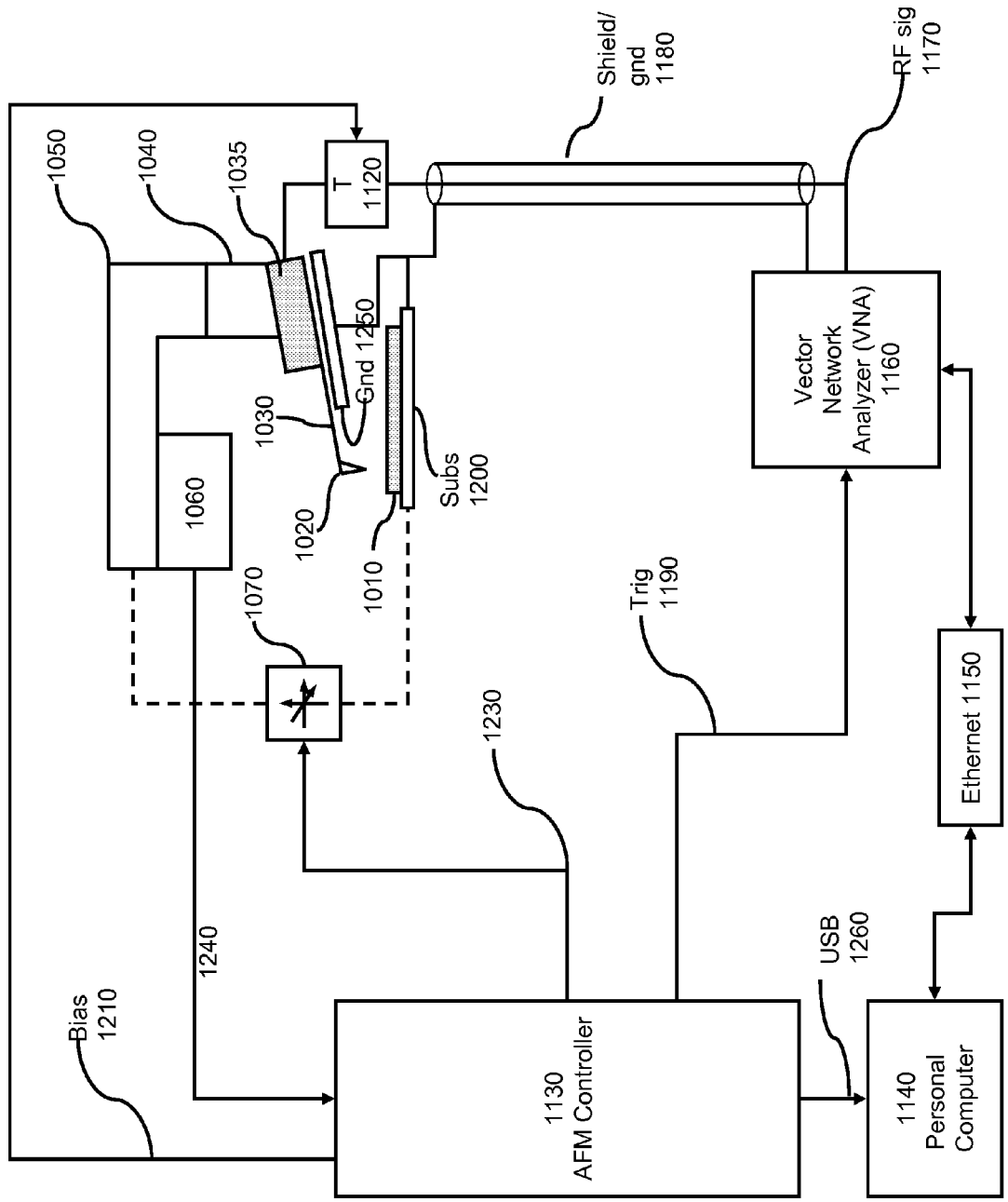
FIG. 1 shows one embodiment of an apparatus for measuring tip-sample capacitance in an atomic force microscope.

FIG. 1 is a block diagram of one embodiment that shows an apparatus for measuring capacitance between a cantilever tip and sample in an atomic force microscope (AFM). A sample 1010 is positioned below a cantilever tip 1020. A motion of the cantilever tip 1020 relative to a frame of the microscope 1050 is measured with a detector 1060, which can include an optical lever or another method known to those versed in the art. A probe chip 1035 is moved relative to the sample 1010 by a scanning apparatus 1070, such as a piezo/flexure combination, but other methods known to those versed in the art could be used.

In order to measure the tip-sample capacitance during a scanning process, the tip 1020, together with a cantilever 1030, must be electrically conducting. This is typically achieved with a tip and cantilever made of a bulk conducting material, or with a tip and cantilever made of a bulk insulator coated with a thin conducting layer. The sample must also be conducting itself, or be backed by a conducting layer 1200. Finally, an insulating layer must separate the tip conductor and the sample conductor to form a capacitor. In some cases, such as with semiconductor samples, a thin layer of insulating oxide naturally occurs in an ambient atmosphere. In other cases, the conducting tip can form an insulating layer naturally. If neither occurs naturally, an insulating layer must artificially be deposited on the tip, the sample top surface, or both. A third option is to command a Z positioner 1070 to maintain a gap between the tip and the sample surface. The insulating layer also prevents an electrical short circuit between the tip and the sample.

A typical AFM cantilever probe has a tip radius of 50 nanometers or less. The capacitances to be measured therefore are in the range of 10 attoFarads ($10^{-18}$ Farads) or less.

Establishing electrical contact with the sample 1010 or its conducting substrate 1200 is relatively uncomplicated because both are typically large enough that a wire may be easily connected. The cantilever 1030 and tip 1020, however, are generally too small for a direct wire connection, and in any event a wire connection would unfavorably affect the cantilever stiffness. Typically, however, the electrically conducting tip 1020 and cantilever 1030 form an uninterrupted circuit with the probe chip 1035. Electrical contact is then made with the part of circuit on the cantilever chip.

It is desirable to make the tip 1020 as tall as possible to minimize parasitic capacitance between the tip/cantilever and the sample. Preferably the tip height is in excess of 100 micrometers. As much of the probe chip 1035 and cantilever 1030 are shielded from the sample by a grounded conducting shield 1250.

The probe chip 1035 and sample conducting substrate 1200 are part of a high frequency electromagnetic resonator circuit 1120. All other things being constant in this circuit, variations in the tip-sample capacitance will alter its resonant frequency. A co-axial cable consisting of a center conductor 1170 and shield 1180 connects the resonator circuit 1120 to a state of the art digital vector network analyzer 1160 (for example, an Agilent Technologies model 5062A). The network analyzer operates by emitting a high frequency (1-3 GHz in this implementation) electromagnetic signal through the co-axial cable toward the resonator circuit 1120. The amplitude and phase of the reflected signal (known as the S11 ("in through 1, back through 1") signal). At resonance, the resonator circuit 1120 absorbs a maximum of energy and exhibits a 90 degree phase shift relative to the excitation signal. Accordingly, the S11 signal exhibits a strong minimum in its amplitude and a 90 degree phase shift at resonance. With the resonant frequency of the resonator circuit 1120 so identified, the desired measure of the tip-sample capacitance is available.

An image of tip-sample capacitance may be generated by commanding the AFM controller 1130 to position the AFM tip 1020 on the surface of the sample 1010 at a specific location and then commanding the network analyzer 1160 to identify the resonant frequency of the resonator circuit 1120 at that point, which is in turn a monotonic function of the tip-sample capacitance. Successively moving the tip 1020 over a grid of locations on the surface of the sample 1010 will create an image of tip-sample capacitance in that grid.

The AFM and the network analyzer 1160 as described in this specification realize high signal to noise measurements largely through digital methods. In essence both instruments contain one or more computers for calculating numerical results from the fundamental measurements they perform. In addition, a personal computer 1140 is used to command the data collection and display the final results and images. These computers introduce inherent, and different, time delays and therefore must be synchronized to ensure that the topographic data collected by the AFM is positioned correctly relative to the capacitance data measured by the network analyzer 1160. To achieve this, the AFM controller 1130 sends digital trigger signals to the network analyzer 1160 via a digital trigger line 1190 and the computer 1140 collects digital measurement data from the AFM controller 1130 via a digital universal serial bus connection 1260 and from the network analyzer 1160 using a digital ethernet network connection 1150. Other digital connections such as the IEEE 488 general purpose interface bus could be used for these connections.

In addition to high frequency electromagnetic signals sent to the probe chip 1035 from the network analyzer 1160, this specification also provides an application of DC or low frequency (<1 GHz) voltage to the probe chip 1035 (and from there to the tip 1020). The result is a bias voltage between the sample 1010 and the tip 1020. The AFM controller 1130 applies this voltage to the tip 1020 via an analog electrical connection 1210 to the bias input of the resonator circuit 1120. This is of interest for samples, notably semiconductor samples, where the tip-sample capacitance varies with bias voltage.

Figure 2:
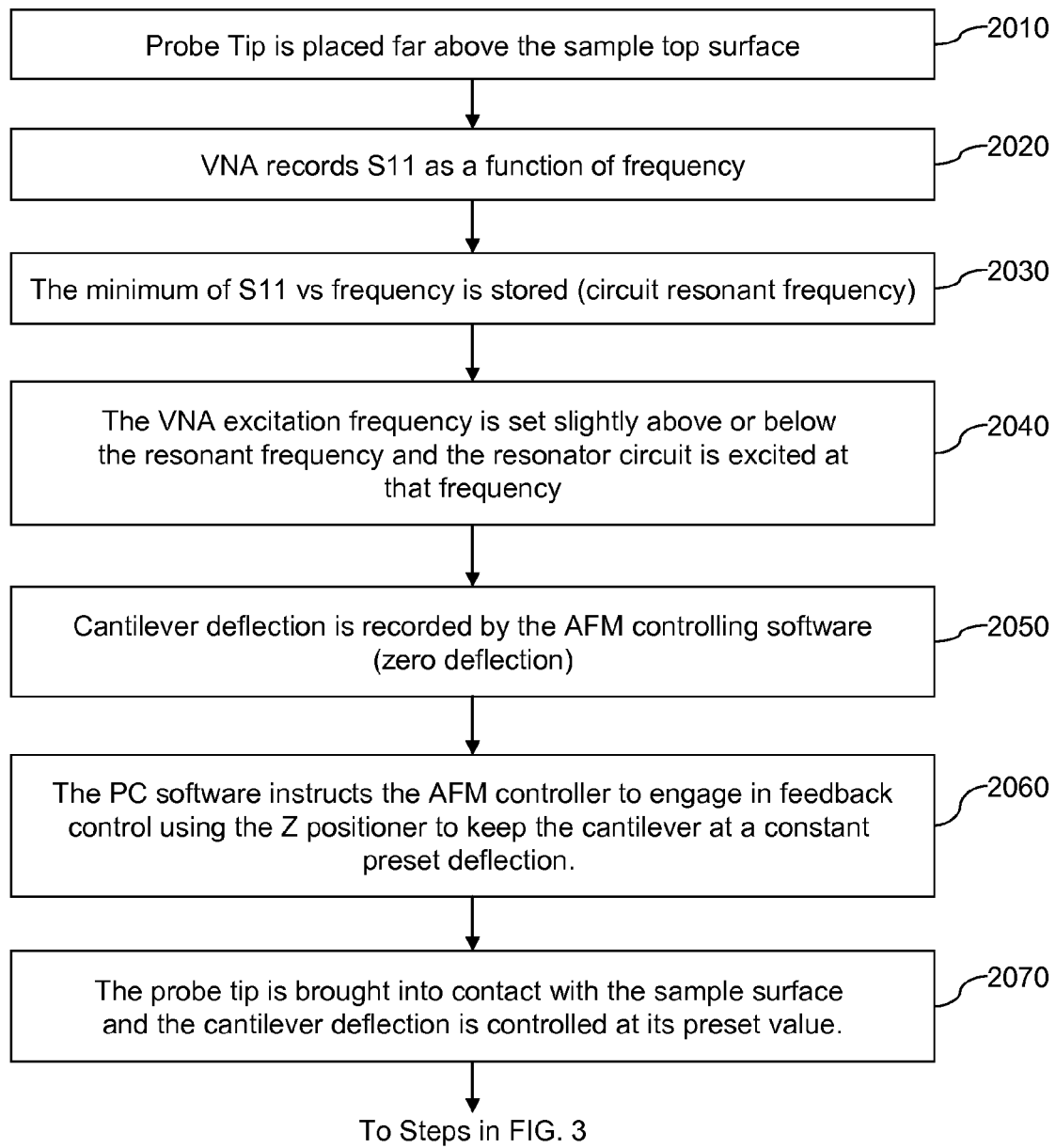
FIGS. 2, 3 and 4 show an example of a method for preparing AFM and VNA to produce an image of sample topography and tip-sample capacitance.
Figure 3:
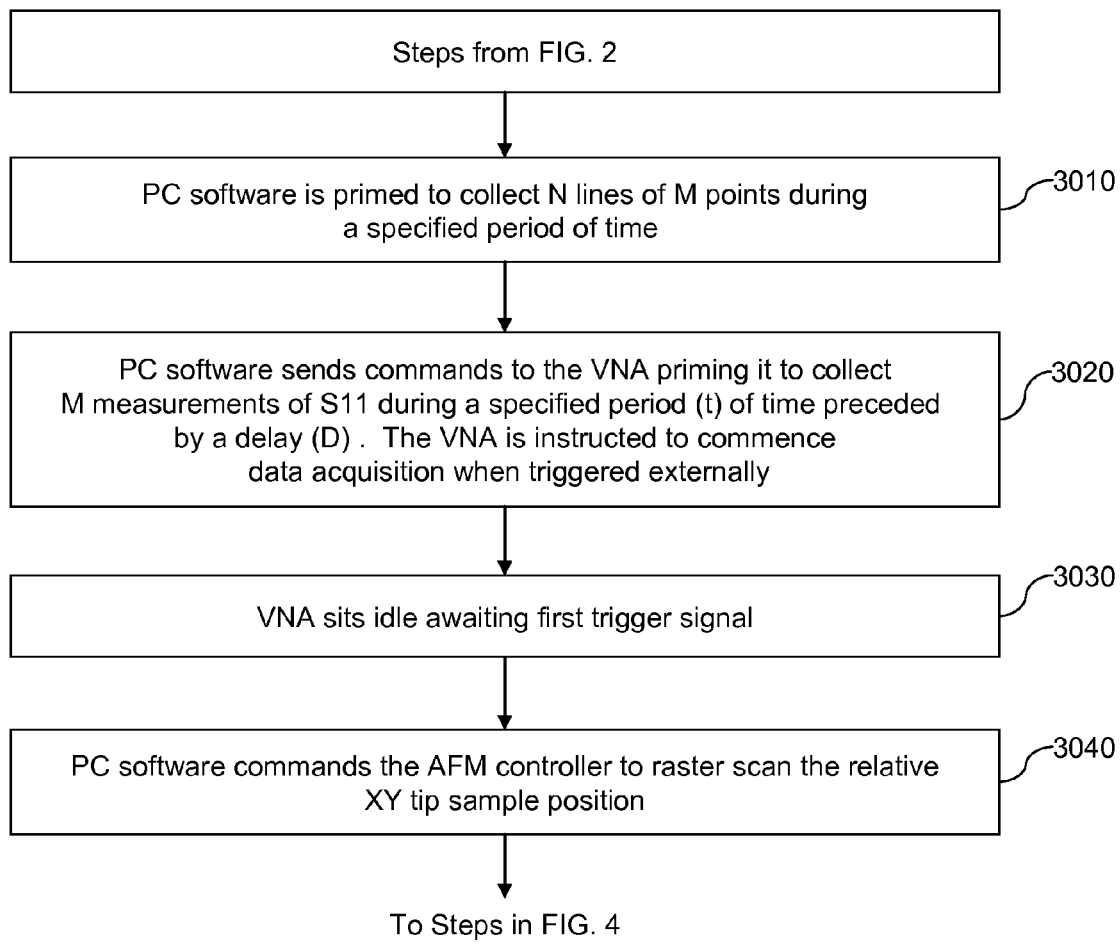
Figure 4:
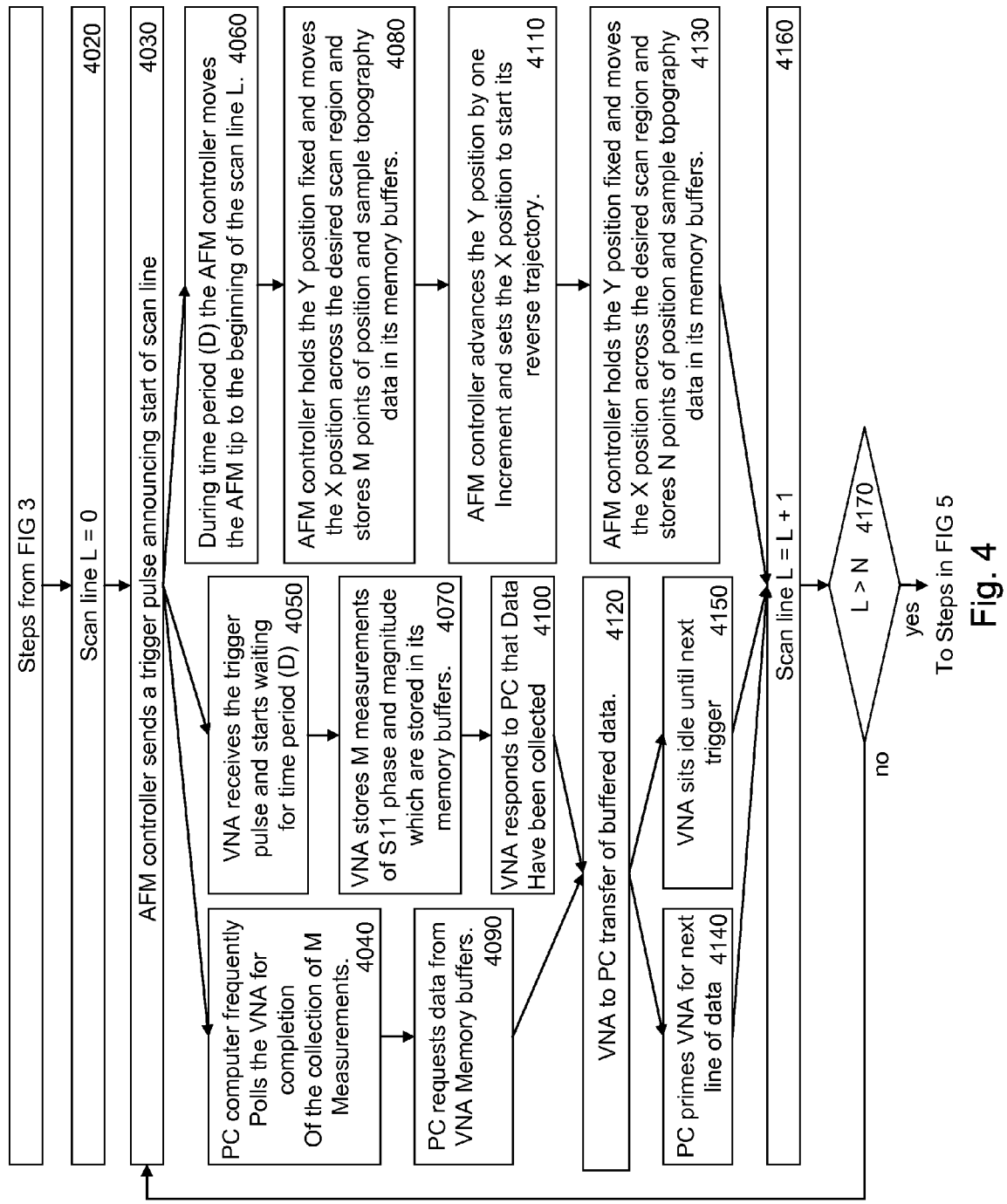

FIGS. 2, 3 and 4 show a method for generating images of tip-sample capacitance.

A less time consuming process is described for generating images of tip-sample capacitance than that implicit in the above description of the apparatus for generating such images. This process performs only one frequency scan when the tip 1020 is retracted far (several micrometers) from the surface of the sample 1010 to identify the resonant frequency of the resonator circuit 1120. Subsequently, the excitation induced by the network analyzer 1160 is held at a set point slightly off resonance while the tip 1020 is scanned across the surface of the sample 1010. Changes in the tip-sample capacitance will cause the resonance curve to shift, resulting in a measured change of the S11 amplitude (which is a monotonic function of the tip-sample capacitance). Because a full frequency sweep at each tip position is not required, the process described with respect to FIGS. 2-4 are orders of magnitude faster than the method implicit in the above description of the apparatus for generating images of tip-sample capacitance. The phase shift between the excitation and reflected signals is also a measure of the shift in the resonance curve and is also a monotonic function of tip-sample capacitance. Hence both amplitude and phase of S11 may be recorded as measures tip-sample capacitance.

Using the AFM controller 1130, the computer 1140 commands the Z positioner 1070 to set the distance between the tip 1020 and surface of the sample 1010 to be sufficiently large they are not in contact (2010).

The computer 1140 instructs the network analyzer 1160 to emit a high frequency electromagnetic signal into the co-axial cable 1170 and 1180 (2020). The signal is swept in a very narrow range from a low frequency (around 1 GHz) to a high frequency (typically around 3.0 GHz). The frequency range is chosen to encompass the first resonance of the resonator circuit 1120. During the frequency sweep of the emitted signal, the network analyzer 1160 records the amplitude and phase of the S11 signal reflected by the resonator circuit 1120.

Because resonator circuits absorb a maximum of energy at or near their resonant frequency, the network analyzer 1160 detects a sharp decrease in the amplitude of the reflected signal at the resonant frequency of the resonator circuit 1120 (2030). The resonant frequency is recorded as the minimum of the graph of reflected signal amplitude versus frequency.

The computer 1140 instructs the network analyzer 1160 to emit a signal at a fixed frequency slightly above or below the resonant frequency measured in 2030 (2040). The deflection of the tip 1020 is measured with the detector 1060.

Using the AFM controller 1130, the computer 1140 commands the Z positioner 1070 to reduce the distance between the probe chip 1035 and the surface of the sample 1010 (2060). The controller 1130 constantly monitors the deflection of the tip 1020 by means of the detector 1060 and operates a feedback loop which halts the approach when the tip 1020 reaches a preset deflection measured relative to the value stored step 2050.

Beyond some critical separation, the tip 1020 contacts with the sample 1010 (2070).

The process continues to FIG. 3. Using the AFM controller 1130, the computer 1140 prepares to raster scan the sample to collect topographic data (3010). The computer software is instructed to collect an image of N lines of M points in a set time period.

The computer 1140 instructs the network analyzer 1160 to anticipate collecting M measurements in a set time period to insure that during each scan line a commensurate quantity of data are collected by the AFM controller 1130 and the network analyzer 1160 (3020). The time period is preceded by a delay incurred when the probe chip starts up or turns around from one scan line to the next. This measurement is to commence at the arrival of a trigger signal from the AFM controller 1130.

The network analyzer 1160 sits idle until the trigger signal is received (3030).

If desirable, a bias voltage between the sample 1010 and the tip 1020 could be applied at this point. As already noted, for some samples, namely semiconductor devices, an applied bias will have an effect on the tip-sample capacitance.

Now the computer software commands the AFM controller 1130 to starts its data acquisition by commanding the XYZ positioners to scan the relative tip-sample position in the XY plane. Since the sample is not perfectly flat, the cantilever will experience changes in deflection as features of varying heights pass beneath the tip. A feedback loop in the controller strives to keep the measured cantilever deflection constant by adjusting the probe chip-sample position in the Z axis. This step, with the others above, constitutes what is commonly known as contact mode AFM.

The next steps no longer occur in a simple sequence. Since there are three computers (1140, 1130 and 1160) running on their own clocks, the timeline spits into three parts. These timelines are only linked during triggering and data transfer events.

The process continues from FIG. 3 to FIG. 4 (410). A scan line L is set to "0" (4020). As soon as the first scan line commences, the AFM controller 1130 emits a trigger signal to the network analyzer 1160 using the digital trigger line 1190 (4030). The trigger signal is used to announce a start of the scan line. When the start of the scan line is announced, the process traces down three process paths. In one path, the computer 1140 polls the network analyzer 1160 to see if new data are ready for transfer (4040). The computer 1140 requests data from memory buffers of the network analyzer 1160 (4090). In response to the request, the network analyzer 1160 transfers buffered data to the computer 1140 (4120). The computer 1140 primes the network analyzer 1160 for next line of data (4140). Alternatively, the network analyzer 1160 sits idle until the next trigger. The next scan line (L=L+1) is indicated (4160).

In another processing path, the network analyzer 1160 starts counting down a pre-programmed delay (4050). The network analyzer 1160 stores M measurements of S11 phase and magnitude that are stored in its memory buffers (4070). The network analyzer 1160 response to the computer 1140 that data has been collected (4100). In response to the request, the network analyzer 1160 transfers its buffered data to the computer 1140 (4120). The computer 1140 primes the network analyzer 1160 for next line of data (4140). Alternatively, the network analyzer 1160 sits idle until the next trigger. The next scan line (L=L+1) is indicated (4160).

For another processing path, during the pre-programmed delay, the AFM controller 1130 moves the AFM tip 1020 to the beginning of the scan line L to be located in the turn around region outside the imaging region (4060).

When the pre-programmed delay expires, the AFM tip 1020 enters the imaging region of the sample 1010 and the network analyzer 1160 concurrently starts collecting capacitance data. The AFM controller 1130 holds the Y position fixed and moves the X position across the desired scan region and stores M points of position and sample topography data in its memory buffers (4080). When the end of the scan line is reached, the AFM controller 1130 commands the XYZ positioners 1070 to reverse the scan in the X direction and increment the Y direction by one increment (4110).

Both the AFM controller 1130 and network analyzer 1160 send their topography and capacitance data for the current scan line to the computer 1140. Upon receipt of this data the images on the computer screen are updated.

At the same time the computer 1140 primes the network analyzer 1160 for the next trigger, the next line of data (4140). The AFM controller 1130 holds the Y position fixed, moves the X position across the desired scan region, and stores N points of position and sample topography data in its memory buffers (4130). The next scan line (L=L+1) is indicated (4160).

This process continues until N scan lines have been completed (4170). Also, note that data are sent from the AFM controller to the computer continuously in small data packets. More detailed steps that may not have been discussed in the text can be found in FIG. 4.

Method for Spectroscopy

The tip 1020 can be brought into contact with the surface of the sample 1010 while there is no relative XY motion between tip and sample. During this stationary contact, other variables such as the high frequency electromagnetic signal emitted by the network analyzer 1160 and bias voltage can be varied to collect data not related to imaging. Often an imaging operation is first preformed and then, based on features in the image, the tip is directed to a particular point of interest to make such measurements.

Figure 5:
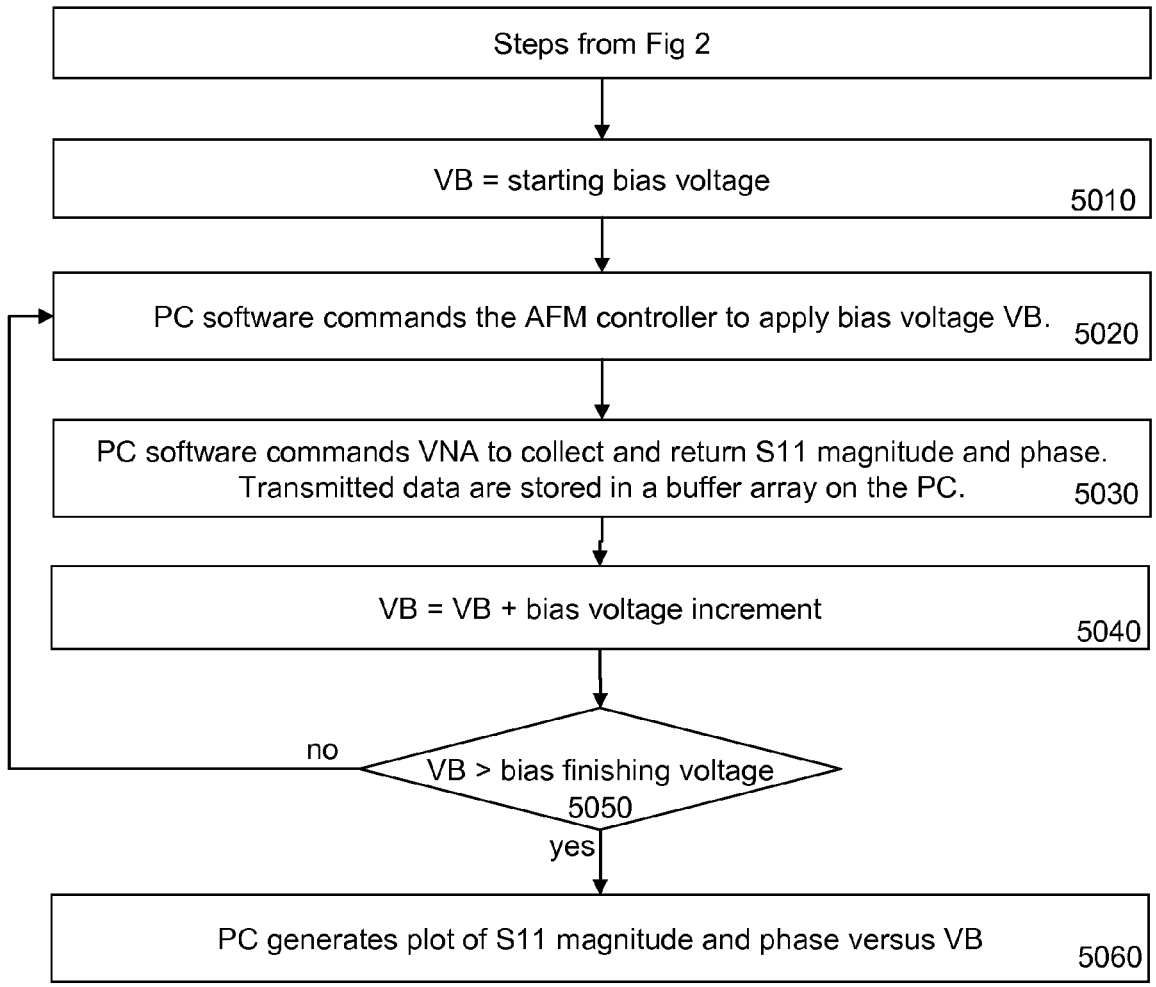
FIG. 5 shows an example of a method for performing tip-sample capacitance spectroscopy.

Spectroscopy Method 1:

FIG. 5 outlines a process for perform spectroscopy as described in this specification. For the spectroscopic measurement described with respect to FIG. 5, the tip 1020 has been brought into contact with the surface of the sample 1010 and that there is no subsequent XYZ motion between the tip and sample, as outlined in the steps of FIG. 2.

A starting bias voltage (BV) is set (5010). The user enters the desired range and step size of a bias voltage sweep into the AFM controller 1130 using the computer 1140, and the entered bias voltage is routed to the resonator circuit 1120 as described above (5020). For example, an application or PC software forwards the message to collect and return S11. For each value of the bias voltage sweep, the software of the computer 1140 commands the network analyzer 1160 to acquire and transmit the amplitude and phase of S11, and the transmitted data are stored in a buffer array on the computer 1140 (5030). The starting bias voltage VB is incremented by VB+bias voltage (5040). A determination is made on whether the bias voltage VB is greater than the bias finishing voltage (5050). When the bias voltage VB is not greater than the bias finishing voltage, the process returns to 5020, where the computer 1140 commands the AFM controller to apply the bias voltage VB. The rest of the process (5030 and 5040) are also performed until determined (5050) that the bias voltage is greater than the bias finishing voltage. Then, the computer 1140 generates plots of S11 amplitude and phase vs. applied tip-sample bias voltage, which are then (5060).

As before, the variables are monotonic functions of tip-sample capacitance. By means of an appropriate calibration method, such as the one described below, a quantitative relationship between S11 magnitude, phase and capacitance can be derived.

Figure 6:
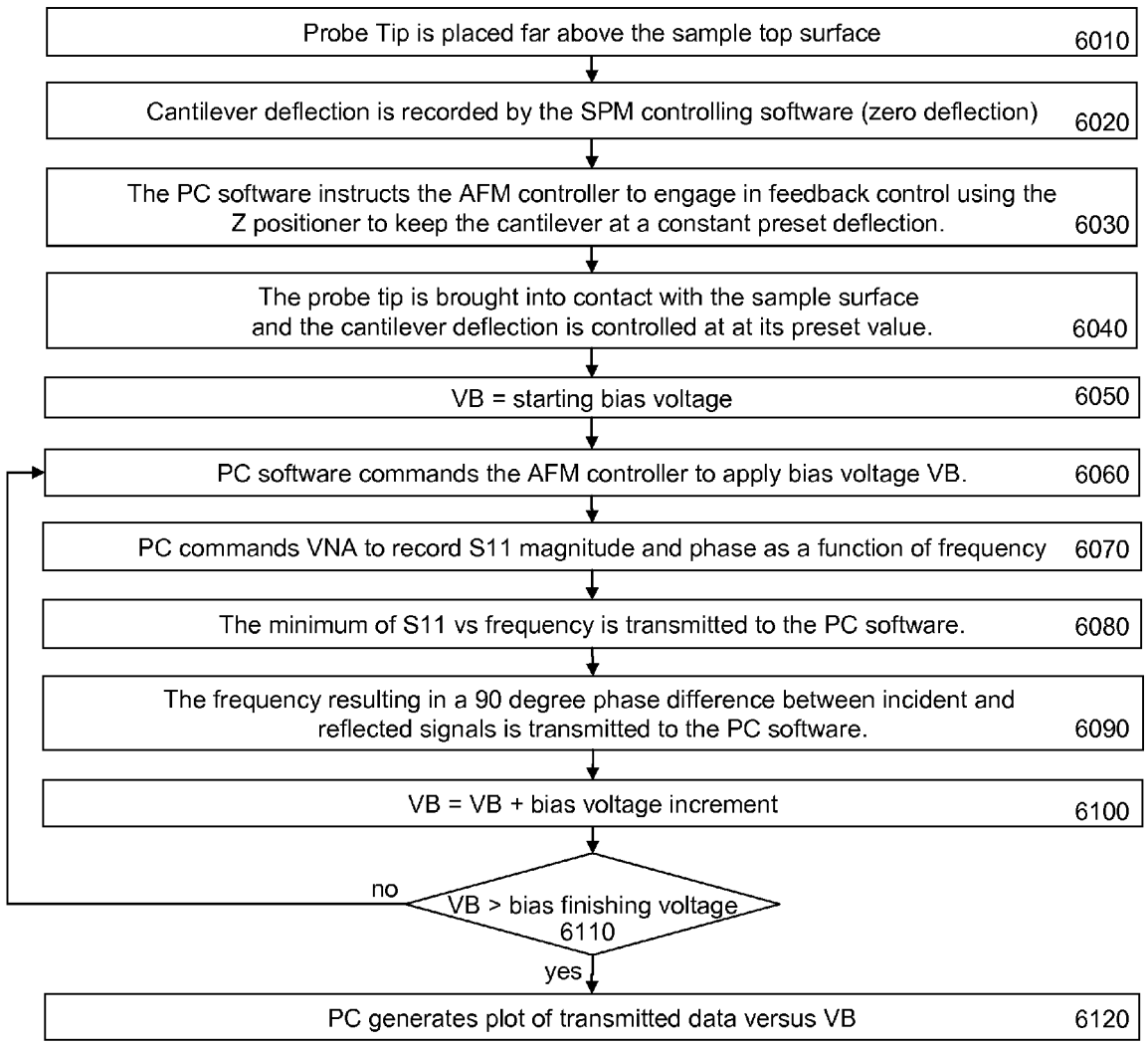
FIG. 6 shows another example of a method for performing tip-sample capacitance spectroscopy.

Spectroscopy Method 2:

FIG. 6 outlines another process for performing spectroscopy. The tip 1020 is brought into contact with the surface of the sample 1010 (6010). The cantilever deflection is recorded by the SPM controlling software (zero deflection) (6020). The computer 1140 software instructs the AFM controller to engage in feedback control using the Z positioner to keep the cantilever at a constant preset deflection (6030). The probe tip is brought into contract with the sample surface and the cantilever deflection is controlled at its preset value. The starting bias voltage VB is set (6050). The user enters the desired range and step size of a bias voltage sweep into the AFM controller 1130 using the computer 1140, from which the entered bias voltage information is routed to the resonator circuit 1120 as discussed above. For each value of the bias voltage, the software commands the network analyzer 1160 to initiate a full frequency sweep producing a measurement of S11 amplitude and phase versus frequency (6060). The computer 1140 commands the network analyzer 1160 to record the S11 magnitude and phase as a function of frequency (6070). The frequency where the magnitude is at a minimum (minimum of S11 vs. frequency) is transferred to the computer 1140 and stored. The frequency where the phase of the reflected signal differs by 90 degrees from the incident signal are transferred to the computer 1140 and stored (6090).

The starting bias voltage VB is incremented by VB+bias voltage (6100). A determination is made on whether the bias voltage VB is greater than the bias finishing voltage (6110). When the bias voltage VB is not greater than the bias finishing voltage, the process returns to 6060, where the computer 1140 commands the AFM controller to apply the bias voltage VB. The rest of the process (6070, 6080 and 6090) are also performed until determined (6110) that the bias voltage is greater than the bias finishing voltage. Then, the computer 1140 generates plots of S11 amplitude and phase vs. applied tip-sample bias voltage, which are then (6120).

Both stored values are a measure of the circuit resonant frequency which is in turn a monotonic function of tip-sample capacitance. By means of an appropriate calibration method, such as the one discussed below, a quantitative relationship between the recorded quantities and tip-sample capacitance can be made.

Figure 7:
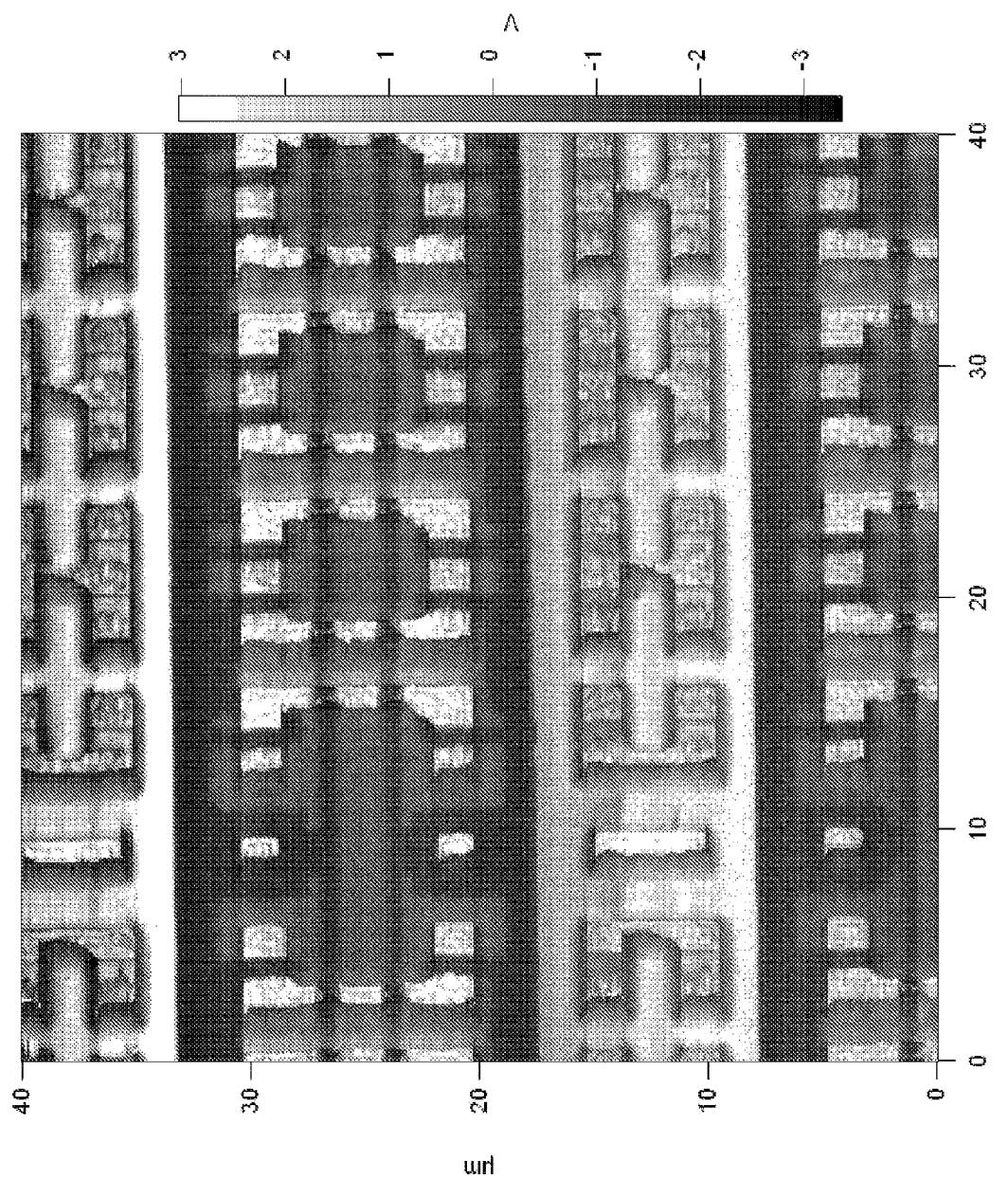
FIG. 7 shows an example of a tip-sample capacitance image of a semiconductor device.

FIG. 7 shows a typical image of S11 magnitude. The hue and intensity in the image are proportional to tip-sample capacitance. The image is of a semiconductor random access memory chip.

Method for Calibration

In order to use the techniques described in this specification to measure absolute tip-sample capacitance, it is necessary to establish the functional relation between the S11 and tip-sample capacitance. In principal, it should be possible to model the relation, but in practice it is difficult to do this with sufficient accuracy to be useful. A major impediment is that while it is the tip-sample capacitance that is of interest, the system also measures the cantilever 1030 and sample 1010 capacitance, as well as the capacitance of any other place where electric fields between the tip 1020 and sample 1010 exist. While the techniques and systems described in this specification can minimize this stray capacitance, it remains a significant unknown. One way to characterize these unknowns, and correct for their presence, is to calibrate the present invention by measurement of a sample with known capacitance.

Figure 8:
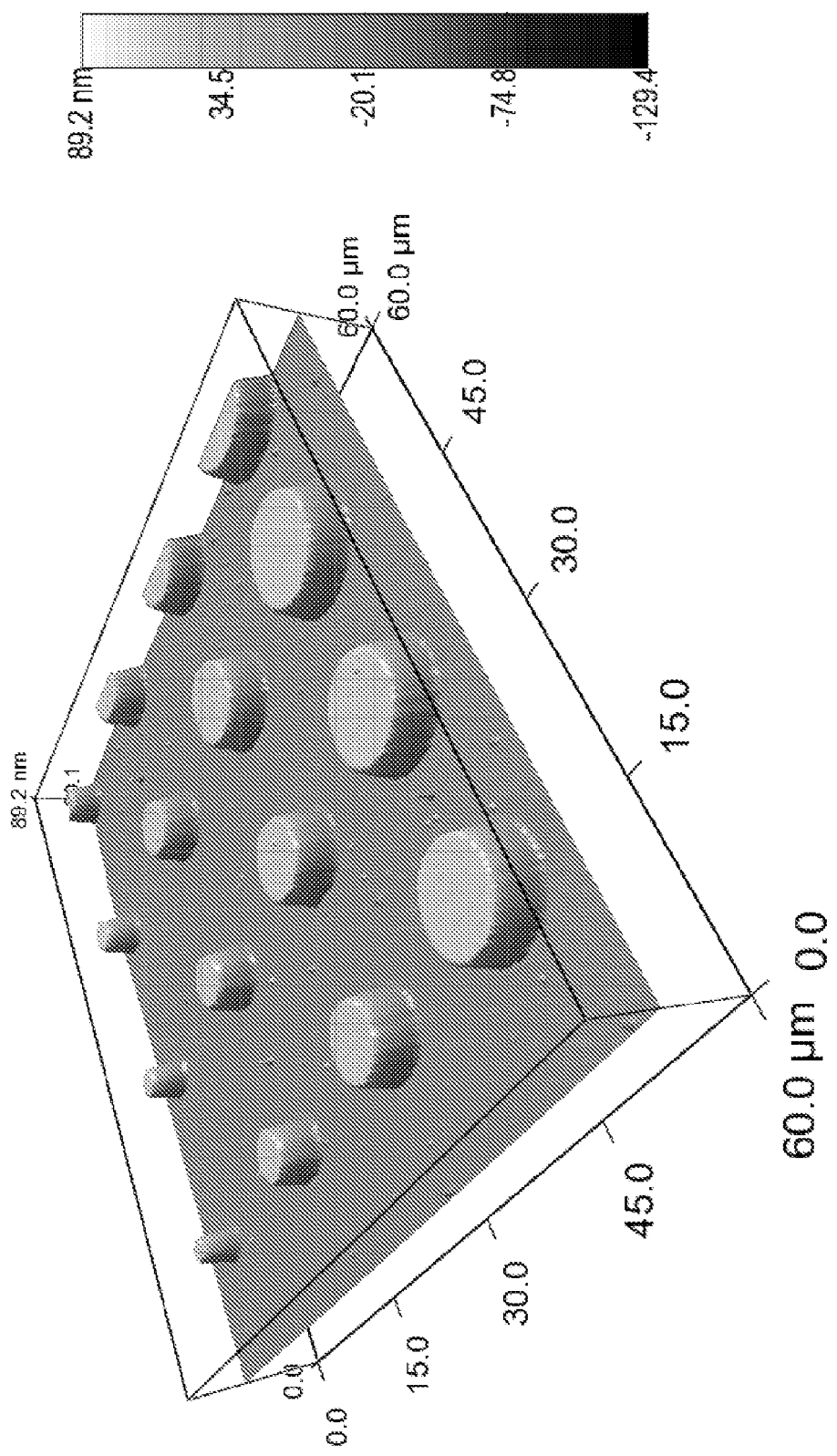
FIG. 8 shows an example of a topographic AFM image of an array of gold dots deposited on oxidized silicon.

FIG. 8 shows an AFM image of a pattern of gold discs of increasing size deposited on a heavily doped silicon wafer (essentially a conductor). The wafer was oxidized to a known thickness prior to the deposition of the gold. The gold discs act as one plate of a capacitor, the oxide as the insulator, and the doped wafer as the other plate. The area of the discs can be very accurately measured and with that information the capacitance of each disc can be calculated from basic principles. While the cantilever is in conductive contact with a particular gold disc, the network analyzer 1160 will return a constant value of S11 when operated in the manner described in FIGS. 2, 3, and 4. Plotting these values of S11 against the diameter of the gold discs, a parabolic relation is expected because the area (and therefore the capacitance) of each disc varies with the square of its diameter.

Figure 9:
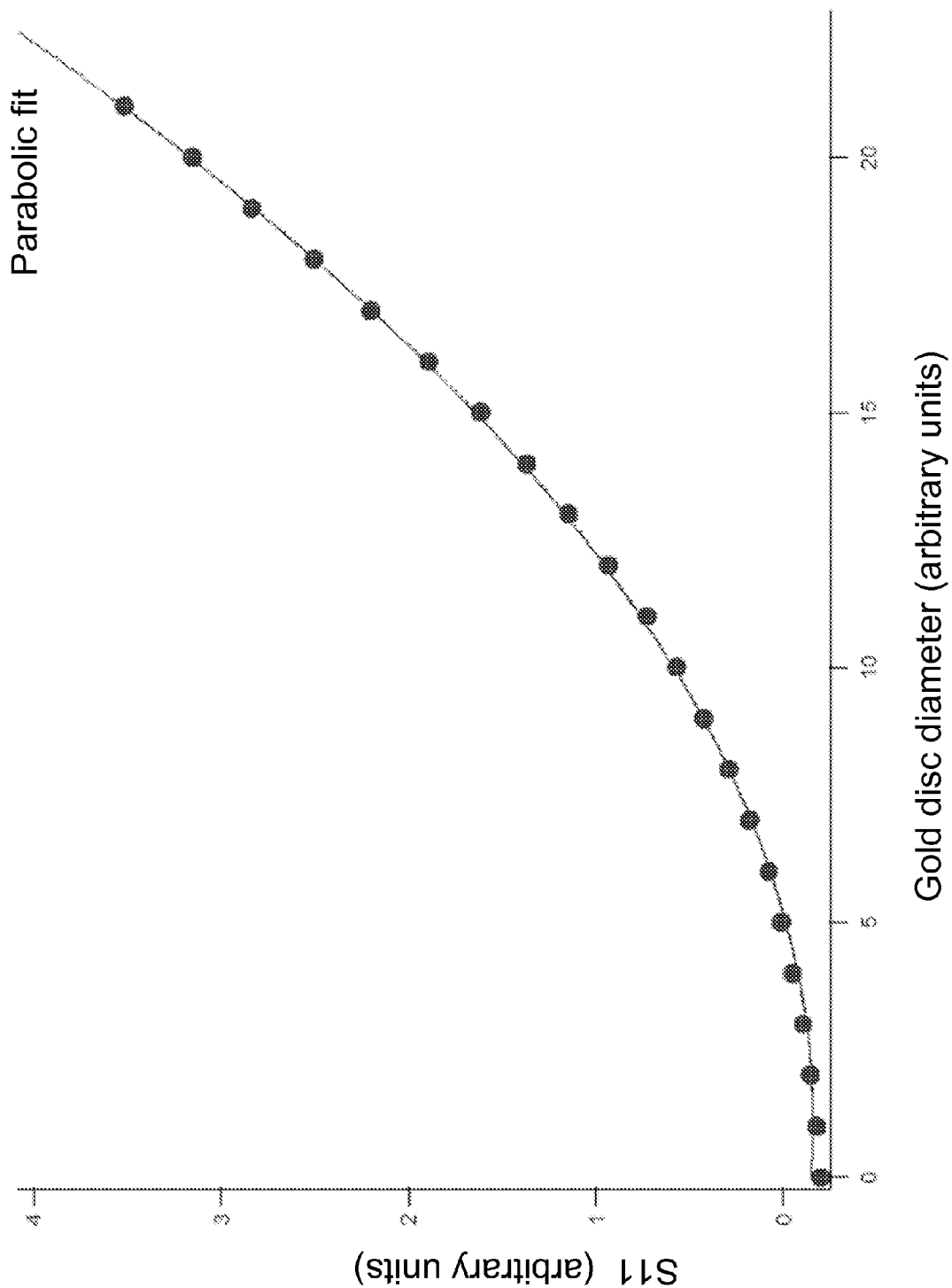
FIG. 9 shows example data representing measured dependence of S11 on gold dot diameter.

FIG. 9 shows such a plot and the fit is indeed parabolic. A parabolic fit through the data indicates a linear and stable response of the measurement system The parabolic fit indicates a linear dependence between S11 and tip-sample capacitance and also implies the system remained stable during the course of the data collection over all the gold discs (in excess of an hour). Stability is crucial since the collected calibration coefficients must remain valid long enough to collect data from samples with unknown properties.

Some reasonable assumptions about the probe tip diameter combined with the fitting parameters derived from the gold discs exercise can now be used to convert S11 measurements of other samples to absolute capacitance. For a doped semiconductor sample one can in turn use the known dependence between dopant concentration and capacitance to relate S11 directly to dopant concentration.

The described embodiments of the present invention are only considered to be preferred and illustrative of the inventive concept. The scope of the invention is not to be restricted to such embodiments. Various and numerous other arrangements may be devised by one skilled in the art without departing from the spirit and scope of the drawings, specification and following claims.

What is claimed is:

1. A method of making a spectroscopic measurement with a scanning capacitance microscope, including an atomic force microscope, having a conductive sample, a cantilever with a conductive tip and a connection for sending a DC or low frequency bias voltage to the tip, and a vector network analyzer receiving signals reflected from a resonator circuit formed by the sample substrate and the tip in response to first signals, comprising:

commanding positioning the tip at a first position far enough from a surface of the sample that the tip does not electrically contact the surface, and commanding emitting a high frequency electromagnetic signal from the network analyzer while said tip is at said first position, and capturing a frequency and amplitude of a second signal reflected from the resonator circuit while said tip is in said first position to determine information indicative of a resonant frequency;

setting an excitation frequency of the network analyzer slightly above or below the resonant frequency of the second signal reflected from the resonator circuit, and setting the network analyzer to excite the resonator circuit at said excitation frequency;

commanding bringing the tip into contact with the surface of the sample;

commanding sending a DC or low frequency bias voltage sweep to the tip;

commanding the network analyzer to acquire the amplitude and phase of a third signal for each value of the bias voltage sweep reflected from the resonator circuit; and calculating plots of signal amplitude and phase vs. each bias voltage applied to the tip in a computer.

2. The method according to claim 1, comprising:

displaying the plots of signal amplitude and phase as a function of bias voltage applied to the tip.

3. A method as in claim 1, wherein said first second and third signals are S11 signals.

4. A method as in claim 3, wherein said signals to said resonator circuit are one of signals from the network analyzer or a bias voltage.

5. A method as in claim 1, further comprising calculating a capacitance for each of a plurality of areas on the sample based on said signal amplitude and phase as a function of bias voltage.

6. A method as in claim 5, wherein said commanding comprises commanding the network analyzer to acquire network and phase of the third signal at a constant frequency.

7. A method as in claim 5, further comprising calibrating to determine a function of tip-sample capacitance relative to said signals, and using said calibrating to determine said capacitance for each said area.

8. A spectroscopic measurement system, comprising:

an atomic force microscope, having a conductive sample, a cantilever with a conductive tip and a connection for coupling a DC or low frequency bias voltage to the tip;

a controller, sending first signals to said tip, and receiving signals reflected from a resonant circuit formed by a sample substrate and the tip in response to said first signals, said controller commanding positioning the tip at a first position far enough from a surface of the sample that the tip does not electrically contact the surface, and emitting a high frequency electromagnetic signal while said tip is at said first position, said controller capturing a frequency and amplitude of a second signal reflected from the resonant circuit and determining a resonant frequency from said frequency and amplitude of said second signal, and then setting an excitation frequency to a value near the resonant frequency, and producing an output which excites the resonator circuit at said excitation frequency, and commanding bringing the tip into contact with the surface of the sample, sending a DC or low frequency bias voltage sweep to the tip and commanding the network analyzer to acquire an amplitude and phase of a third signal for each of a plurality of values of the bias voltage sweep reflected from the resonator circuit; and calculating plots of signal amplitude and phase for each bias voltage applied to the tip.

9. The system as in claim 8, further comprising a display device displaying the plots of signal amplitude and phase as a function of bias voltage applied to the tip.

10. The system as in claim 8, wherein said first second and third signals are S11 signals.

11. The system as in claim 10, further comprising a network analyzer, wherein said signals to said resonator circuit are from the network analyzer.

12. The system as in claim 8, further comprising a computer that is programmed for calculating a capacitance for each of a plurality of areas on the sample based on said signal amplitude and phase versus bias voltage.

13. The system as in claim 12, wherein said controller commands the network analyzer to acquire network and phase of the third signal at a constant frequency.

14. The system as in claim 12, further comprising calibrating to determine a function of tip-sample capacitance relative to said signals, and using said calibrating to determine said capacitance for each said area.

15. A method, comprising:

using an atomic force microscope which has a cantilever device with a tip that can be controlled relative to the sample to obtain capacitance values of each of a plurality of areas on said sample, said using comprising:

first moving the tip to a first location remote from the surface of the sample such that the tip does not touch the sample;

determining a resonant frequency of a circuit comprising the tip and sample while said tip is at said first location;

setting an operating frequency of the atomic force microscope to a value near the resonant frequency of the tip and sample of said first location;

contacting said tip to said sample subsequent to said setting said operating frequency;

while keeping said tip and said sample at said value close to resonant frequency, determining a capacitance of a plurality of different areas on the surface of said sample, by moving said tip relative to said sample to said different areas and determining values between said tip and sample at said value close to resonant frequency.

16. A method as in claim 15, further comprising forming a calibration map of a relationship between values between said tip and sample, and capacitances attributable to said values, and using said calibration map to determine said capacitance.

17. A method as in claim 16, wherein said values in said calibration map include both amplitude and phase of a returned value from applied tip-sample bias voltage.

18. A method as in claim 16, wherein said values in said calibration map include amplitude and phase and applied tip-sample bias voltage over a specified range.

19. A method as in claim 15, wherein said moving said tip comprises scanning the tip across x and y positions.

20. A method as in claim 19, wherein said moving the tip comprises first holding a y position constant while scanning in the x direction one increment at a time, detecting reaching the end of a line in the x direction, moving in the y direction one increment, and then reversing movement in the x direction one increment at a time to move in an opposite direction to that moved during said first holding.

* * * * *